United States Patent [19]

Santeusanio

[11] Patent Number: 4,813,838

[45] Date of Patent: Mar. 21, 1989

[54] AUTOMATIC LOADER FOR COMPUTER DISKETTES

[75] Inventor: Peter M. Santeusanio, Lynnfield, Mass.

[73] Assignee: Trace Products, Inc., San Jose, Calif.

[21] Appl. No.: 781,401

[22] Filed: Sep. 27, 1985

[51] Int. Cl.⁴ .................. B65G 59/06; G11B 17/10
[52] U.S. Cl. .................. 414/798.1; 209/698; 221/205; 221/298; 360/98.05
[58] Field of Search .................. 414/126, 222; 360/98; 209/698 X; 221/205, 298, 200, 285

[56] References Cited

U.S. PATENT DOCUMENTS

| 3,305,087 | 2/1967 | Lücker | 209/698 X |
| 4,072,090 | 2/1978 | Heisler | 221/298 X |
| 4,271,980 | 6/1981 | Frieser et al. | 414/126 X |
| 4,510,542 | 4/1985 | Aggeler | 360/98 |

FOREIGN PATENT DOCUMENTS

| 120172 | 9/1979 | Japan | 414/126 |
| 0012021 | 1/1984 | Japan | 414/126 |

Primary Examiner—Robert J. Spar
Assistant Examiner—Janice Krizek
Attorney, Agent, or Firm—Rosenblum, Parish & Bacigalupi

[57] ABSTRACT

A computer diskette automatic loading device having a hopper for holding a plurality of diskettes, and an automated diskette selection mechanism for the serial removal of diskettes from the hopper for processing and sorting of diskettes into accept and reject bins.

4 Claims, 10 Drawing Sheets

AUTOMATIC LOADER FOR COMPUTER DISKETTES

BACKGROUND OF THE INVENTION

CROSS-REFERENCE TO PATENT DISCLOSURE DOCUMENTS

This application is related to two Patent Disclosure Documents; Document #126207 filed Apr. 2, 1984 by Peter M. Santeusanio and Document #122867 filed Dec. 2, 1983 by Peter M. Santeusanio.

1. Field of the Invention

The present invention relates to devices for the automated handling of computer diskettes and more particularly to a device for the automated loading and unloading 3 1/2 inch hard case micro-floppy diskettes into a disk drive and the subsequent sorting thereof.

2. Description of the Prior Art

In current devices for the automatic handling of diskettes, the unprocessed diskettes are loaded into a vertical hopper in a flat stacked configuration. A disk to be processed is slipped from the bottom of the stack by a pushing device and driven into a disk drive. Following completion of operations on the diskette within the disk drive, the diskette is ejected from the disk drive and sorted into a reject bin or an accept bin.

The present invention includes improved methods of stacking disks for processing, handling disks and the sorting of disks into accept or reject bins.

SUMMARY OF THE INVENTION

It is an object of the present invention to provide an improved method for stacking disks to be processed.

It is another object of the present invention to provide an improved methods for selecting individual disks from a stack for processing.

It is a further object of the present invention to provide an improved method for sorting disks into an accept or reject bin.

The instant invention includes a hopper for holding diskettes to be processed, which hopper is oriented at an angle that is substantially away from the vertical. A disk clamping mechanism holds several of lowermost disks of the stack, such that a single lowest disk can be selectively removed from the stack and dropped onto a disk supporting track. A disk pushing mechanism is then activated to push the disk along the track into a disk drive. The disk is then processed with the disk drive. Upon completion of processing, the disk is rejected from disk drive and located upon a sorting mechanism portion of the track. The sorting mechanism includes left and right slideable track portions which support the disk. Either of the slideable track portions is activated depending upon whether the disk is acceptable or rejected. Movement of a slideable portion of the track causes the disk to fall upon a tent-like structure located beneath the disk track, and depending upon which side of the track was activated, the disk will fall to the left side or the right side of the sorting tent structure. Disks from the sides of the sorting tent structures are collected into a reject bin or an accept bin.

It is an advantage of the present invention that disks are selected from the hopper without sliding upon one another.

It is another object of the present invention that the sorting mechanism occupies a limited amount of space on the track.

It is yet another advantage of the present invention that disks may be rapidly processed with minimal risk of physical damage. These and other objects and advantages of the present invention will become obvious to one ordinarily skilled in the art upon further review of the following drawings and detailed description of the preferred embodiment.

In the Drawing

DESCRIPTION OF THE PREFERRED EMBODIMENTS

Figure 1:
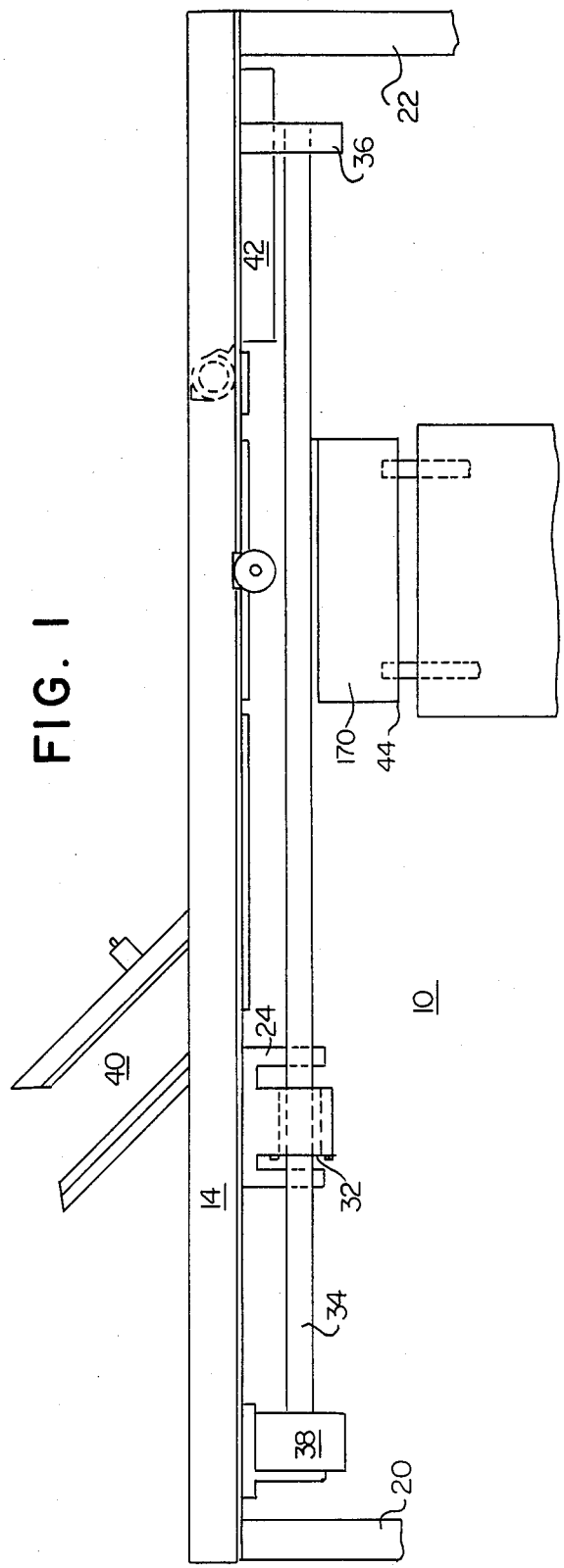
FIG. 1 is a side elevational view of the automatic loader of the present invention.
Figure 2:
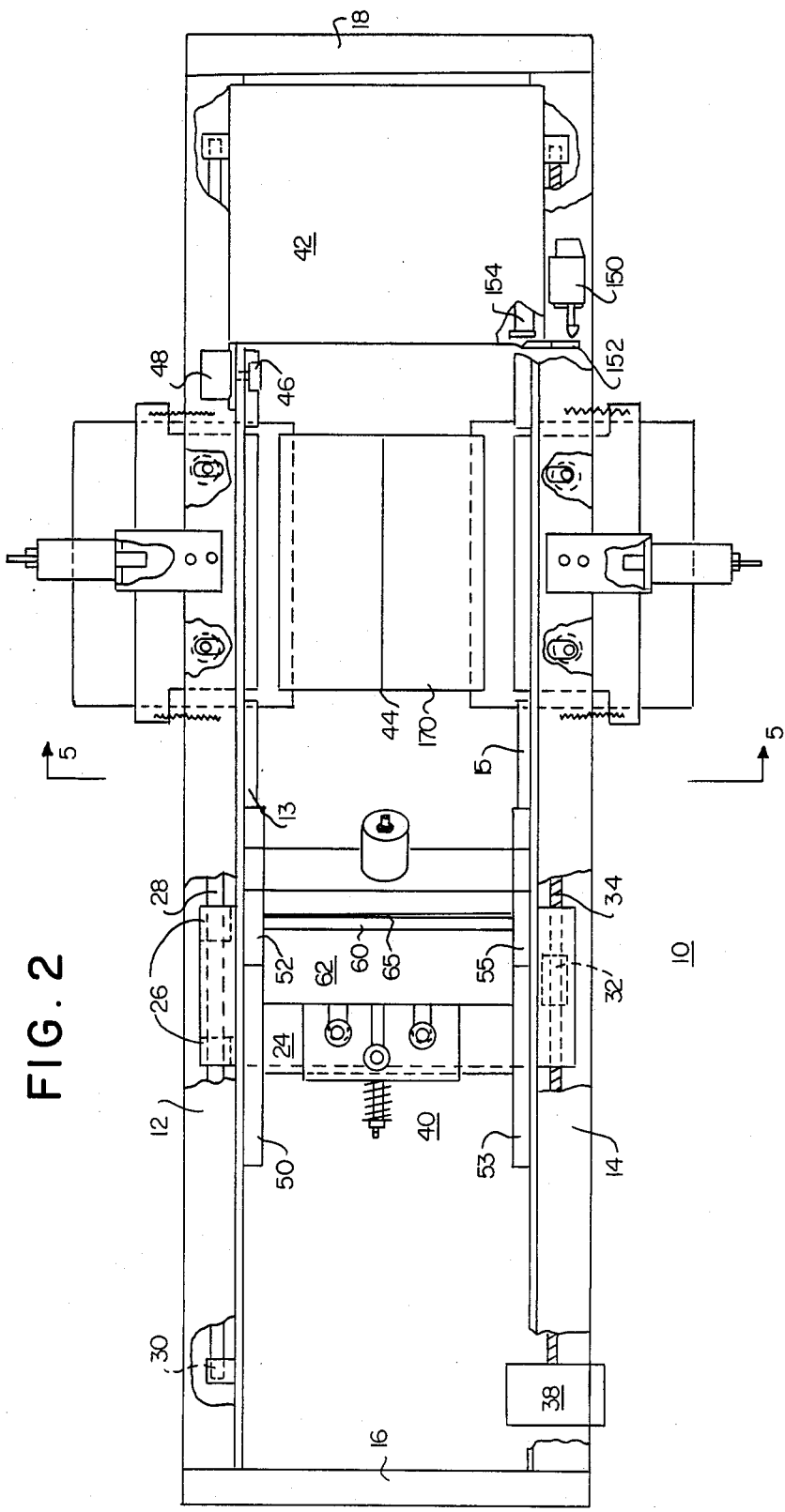
FIG. 2 is a top plan view of the automatic loader of the present invention.

The instant invention is a device to automatically remove a hard case 3.5 inch diskette (herein after refer to as a disk) from a stack of such disks, load it into a disk drive where it is operated on, such as by being certified, copied or formatted, remove it from the disk drive and sort it into an accept bin or a reject bin. FIGS. 1 and 2 show simplified side and top views of the device. As depicted therein, the device 10 has a basic frame having two L-shaped channel sections 12 and 14 that are separated by spreader member 16 and 18 at the ends thereof, such that the distance between the inside walls of channel 12 and 14 is slightly larger than the width of a disk. The frame is supported by a leg in each corner such as 20 and 22 in FIG. 1. Disk support rails 13 and 15 are mounted to the channels 12 and 14 respectively and serve to provide slideable support to two opposite edges of disks located between the channels 12 and 14. A disk carriage 24 is located generally between the channel sections 12 and 14. The carriage 24 is supported on one side by two linear bearings 26 which rise on a rod 28 that is joined to the frame at its ends 30. The other side of the carriage is supported by a lead screw nut 32 which engages a lead screw 34. The lead screw is supported by pillow blocks 36 containing radial bearings, and is driven by a stepper motor 38 at one end. The stepper motor 38 is also mounted to the frame.

A disk holding hopper 40 extends upwardly from between the two channels 12 and 14 at an angle substantially removed from the vertical. While an angle of 45 degrees has been found to be appropriate, substantial departures therefrom are within the scope of the invention. A detailed description of the hopper mechanism is found hereinafter. A disk drive 42 is joined to the other end of the channels 12 and 14 such that a disk may be pushed directly into the drive portion of the disk drive 42. A sorting mechanism 44 is located generally between and beneath the channel members 12 and 14. The sorter 44 is placed proximate the disk drive to facilitate the prompt sorting of disks into an accept bin or a reject bin following processing of the disk within the disk drive 42. A disk eject wheel 46, activated by motor 48, it utilized to push the disk from the disk 42 to the sorter 44.

From the preceding description it is therefore to be generally understood that a disk from hopper 40 is selectably positioned on disk support rails 13 and 15, whereupon it is pushed by carriage 24 into the disk drive 42. Following processing within the disk drive 42 the disk is ejected and moved by rotation of the ejection wheel 46 to the sorter 44. The sorter is then activated to cause the disk to fall into a reject bin or an accept bin.

Figure 3:
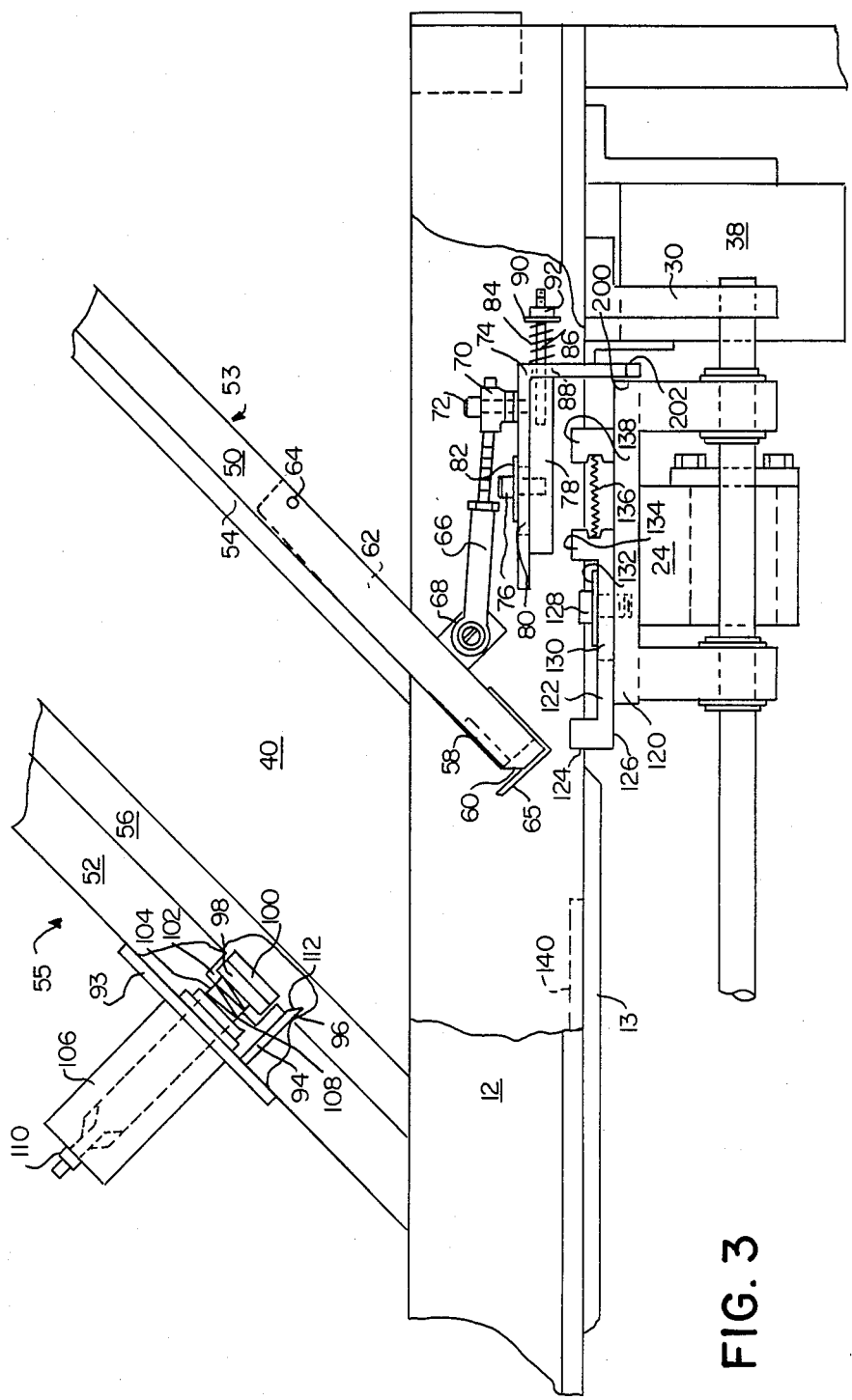
FIG. 3 is a side elevational view of the hopper mechanism of the present invention.
Figure 6:
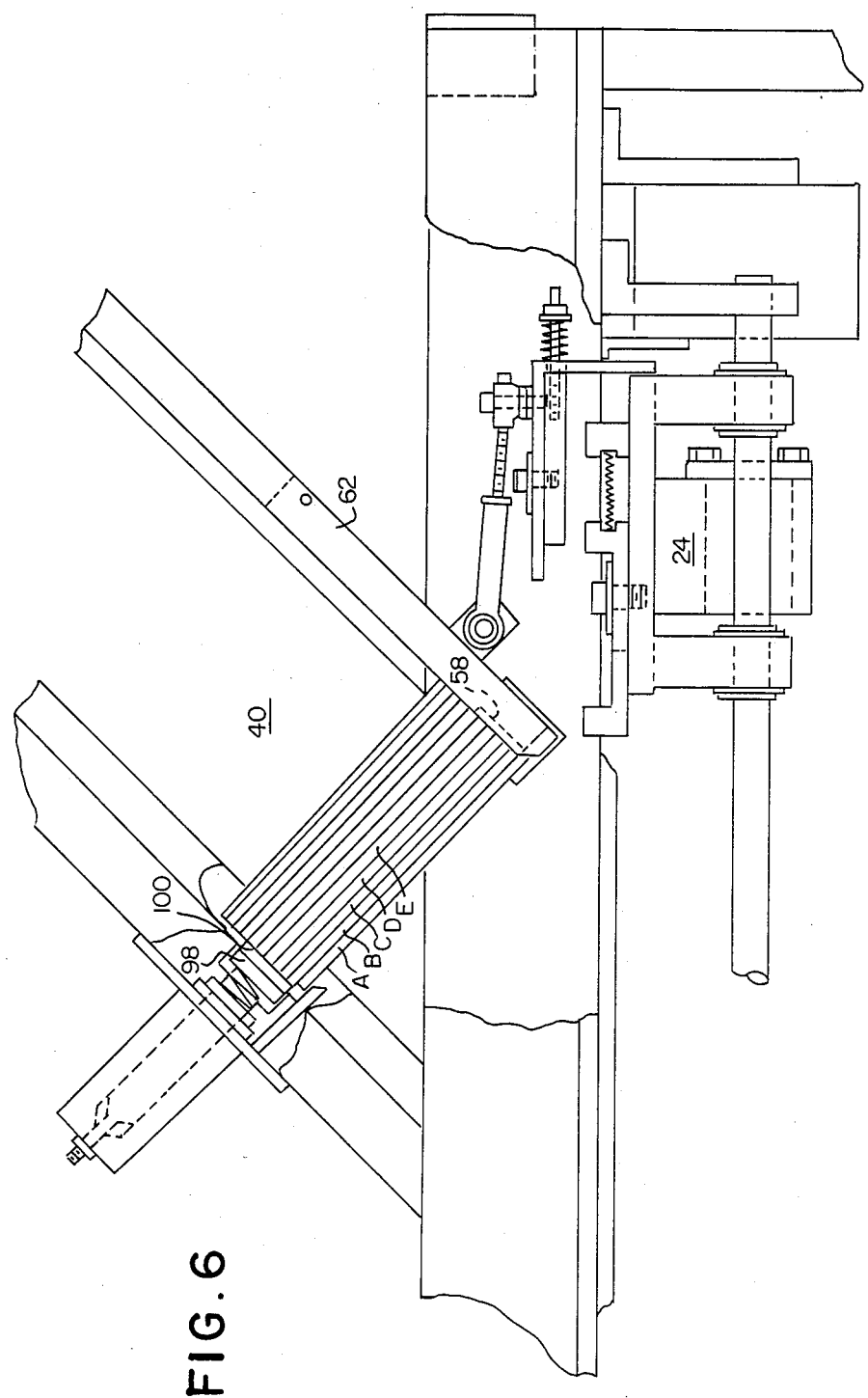
FIG. 6 is a side elevational view of the hopper mechanism of the present invention during a stage of hopper activation.

FIG. 3 presents a detailed side elevational view of the hopper and carriage mechanisms of the present invention. The hopper 40 is formed from 4 pieces of bar stock, each piece forming a corner of the hopper. Two corner pieces 50 and 52 are shown joined to channel 12 at an angle of approximately 45 degrees, it being understood that the other two corner pieces 53 (lower) and 55 (upper), are joined to channel 14 at a similar angle. A guide strip 54 and 56 is joined to each bar 50 and 52 respectively to form an edge guide for disks which will be loaded into the hopper as depicted in FIG. 6. Similar guides are attached to corner pieces 53 and 55. The lower portion of each rear hopper corner 50 and 53 has a piece of high compliance rubber 58 mounted thereto such that the surface of the rubber 58 is flush with the surface of the corner bar that makes contact with the disks in the hopper. The lowermost front edge of the lower corner bar 50, and the corresponding lower corner bar 53, not shown, is chamfered as at 60 to facilitate disk movement from the hopper 40, as is hereinafter described.

A generally rectangular disk kicker plate 62 is located between the lower corners bars 50 and 53. A lower disk stop 65 is attached to and protrudes upwardly from the lower end of the kicker plate 62 to act as lower stop on a stack of disks loaded into the hopper, as depicted in FIG. 6. The kicker plate is pivotally mounted by pivot 64 located at its upper end to the lower corner bars 50 and 53. A kicker plate actuating rod 66 is mounted by a bracket 68 to the lower side of the kicker plate 62. The other end of the rod 66 is mounted through a bearing 70 and bolt 72 to an "L" shaped actuator plate 74. The actuator plate 74 is mounted with two shoulder screws 76 (one shown) to an actuator support 78 which is fixedly mounted to the channel members 12 and 14. The actuator plate 74 has a slotted hole 80 formed therethrough such that a sliding motion of the actuator plate 74 upon the support 78 can be achieved; a nylon washer 82 facilitates the sliding motion. The actuator plate 74 is urged to a forward position (as shown in FIG. 3) by a spring 84 which is supported by a rod 86 which passes through a hole 88 in the plate 74 and is screwed into the support 78. A washer 90 and nut 92 support the outward end of spring 84 upon rod 86. It is therefore to be realized that the actuator plate 74 slides laterally on the support 78 when it is actuated as is described hereinafter, and that its movement towards the right in FIG. 3 will cause the kicker plate 62 to pivot downwardly about pivot point 64.

Figure 10:
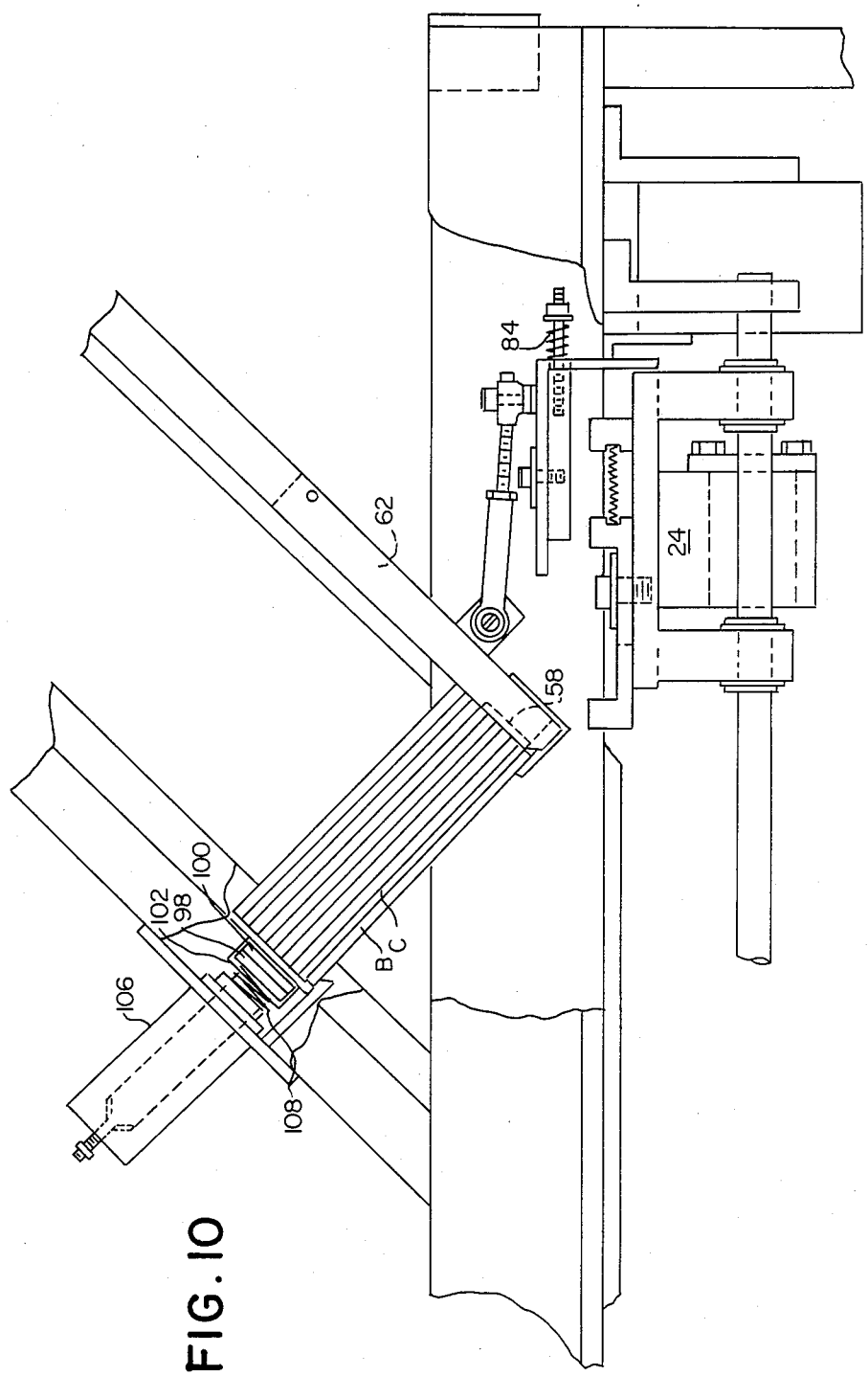
FIG. 10 is a side elevational view of the hopper mechanism of the present invention during yet a further stage of hopper activation.

A top disk support mechanism 98 is located between the front hopper corner bars 52 and 55. A front hopper support plate 93 is joined to the hopper corner bars 52 and 55. An upper disk stop 94 protrudes downwardly from the plate 93 into the hopper area, such that its protruding lowermost end 96 will contact and stop disks loaded into the hopper as is depicted in FIG. 6. A pressure plate 98, having a piece of high compliance rubber 100 attached to the lower side thereof, is disposed across the upper hopper area such that the pressure plate 98 resides within notches 102 formed in the corner bars 52 and 55. The upper side of the pressure plate 98 is attached to a plunger 104 of a solenoid 106, and a spring 108 is used to urge the pressure plate 98 downwardly when the solenoid 106 is not activated. An adjustment nut 110 limits the downward throw of the pressure plate 98. As can be seen in FIG. 3 the downward throw of the pressure plate allows the rubber pad 100 to protrude within the hopper when no disks are present, however when the solenoid 106 is activated, there is sufficient room in the notches 102 to allow the rubber pad 100 to be pulled flush with bar 52 and out of contact with the disks in the hopper, as is depicted in FIG. 10. To facilitate disk handling, the lower edge 112 of support 94 is chamfered.

The carriage 24 is supported on one side by two linear bearings 26 which ride on a rod 28. The other side of the carriage is supported by a lead screw nut 32 which rides on a lead screw 34 (not shown in FIG. 3.). The carriage is formed with a flat platform 120 which has a disk pusher 122 slideably mounted thereon. The pusher 122 has a front disk contact face 124 and a flat lower surface 126 for sliding upon the upper surface of platform 120. Two shoulder screws 128 (one of which is shown in FIG. 3.) pass through slotted holes 130 formed through the pusher 122 and are threadably engaged in platform 120. A nylon washer 132 aids in permitting the slideable engagement of the pusher 122 with the platform 120. The rearward portion 134 of the pusher 122 is urged to a forward (left in FIG. 3.) position by a spring 136 that is braced at its rearward end in a block 138 which is fixedly mounted to platform 120. A rearward most portion 200 of platform 120 is displaced to make contact with a downwardly projecting portion 202 of the actuator 74, as is described hereinafter. It is therefore to be appreciated that upon rotation of the lead screw 34 in a first direction that the carriage will be propelled backwardly (to the right in FIG. 3.) such that the rearward portion 200 of platform 120 will push against the lowermost portion 202 of the actuator 74. Likewise, with the rotation of lead screw 34 in the other direction the carriage 24 will be propelled in a forward direction (leftward in FIG. 3.) to make contact between a rearward edge of a disk 140 and the pushing surface 124 of disk pusher 122, and that the carriage 24 will thereafter push the disk 140 down the track and into the disk mount of disk drive 42. The slideable engagement of pusher 122 with platform 120 and the spring 136 provide a margin of compliance such that the risk of damage to the disk drive by overly forceful insertion of the disk is minimized.

Figure 4:
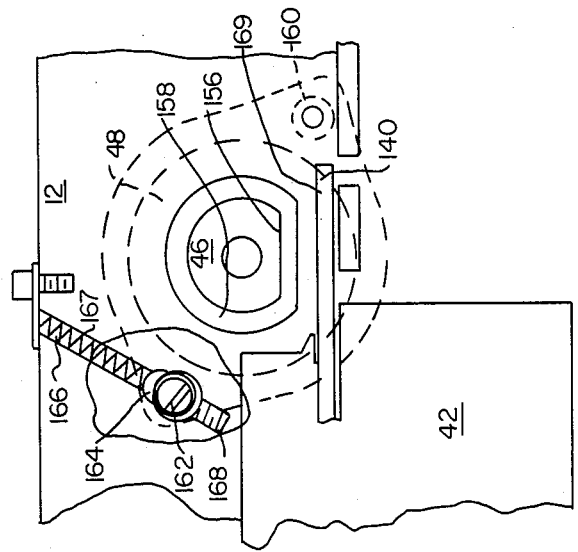
FIG. 4 is a side elevational view of the disk ejection mechanism of the present invention.

FIG. 4. is a side elevational view of the disk ejection mechanism of the present invention. Following the completion of operations upon a disk with in the disk drive, it is necessary to fully eject the disk from the drive and place it in the proper position for sorting. To accomplish this, a disk ejection motor 48 is mounted to channel 12 such that the armature protrudes through a hole in channel 12, and a disk ejection wheel 46 is mounted to the armature and positioned above the disk track. The wheel 46 has a cutaway chord section 156 and is surrounded by a high durometer rubber tire 158. The wheel is positioned such that a disk will pass under the chord section 156 without contacting the tire 158, but that upon rotation of the wheel 46 a disk located thereunder will be contacted by tire 158. The motor is mounted to the channel 12 with a first screw 160 which passes through the motor mounting flange and is threadably engaged in the channel 12. The mounting is formed such that the motor is free to rotate about screw 60. A second motor mounting screw 162 passes through a slotted hole 164 in channel 12 whereby the motor mount can move throughout the longitudinal distance of slot 164. A hole 166 is formed in channel 12 along the longitudinal axis of slot 164, which hole 166 passes through the slot 164 a sufficient distance to allow for the threadable insertion of a set screw 168 into the lower end thereof. It will thus be appreciated that set screw 168 will make contact with the shank of screw 162 and form an adjustable lower stop on the motion of screw 162 within slot 164. A spring 167 is inserted within hole 166 to urge screw 162 into resilient contact with set screw 168. It will therefore be appreciated that upon the normal ejection of a disk 140 from the disk drive 42 that a front portion 169 of the disk 140 will extend approximately one inch out of the disk drive and will be located beneath the chord section 156 of wheel 46. Upon rotation of wheel 46, the tire 158 will contact the front portion 169 of disk 140 and impel it out of the disk drive 42. The contact of tire 158 with disk 140 will cause the motor to rise slightly, whereby mount screw 162 will push upwardly against spring 167, and spring 167 will urge the motor and tire 158 into continued good contact with disk 140. The motor mount described hereinabove assures smooth ejection of the disk from the disk drive and onto the sorter mechanism of the device.

Figure 5:
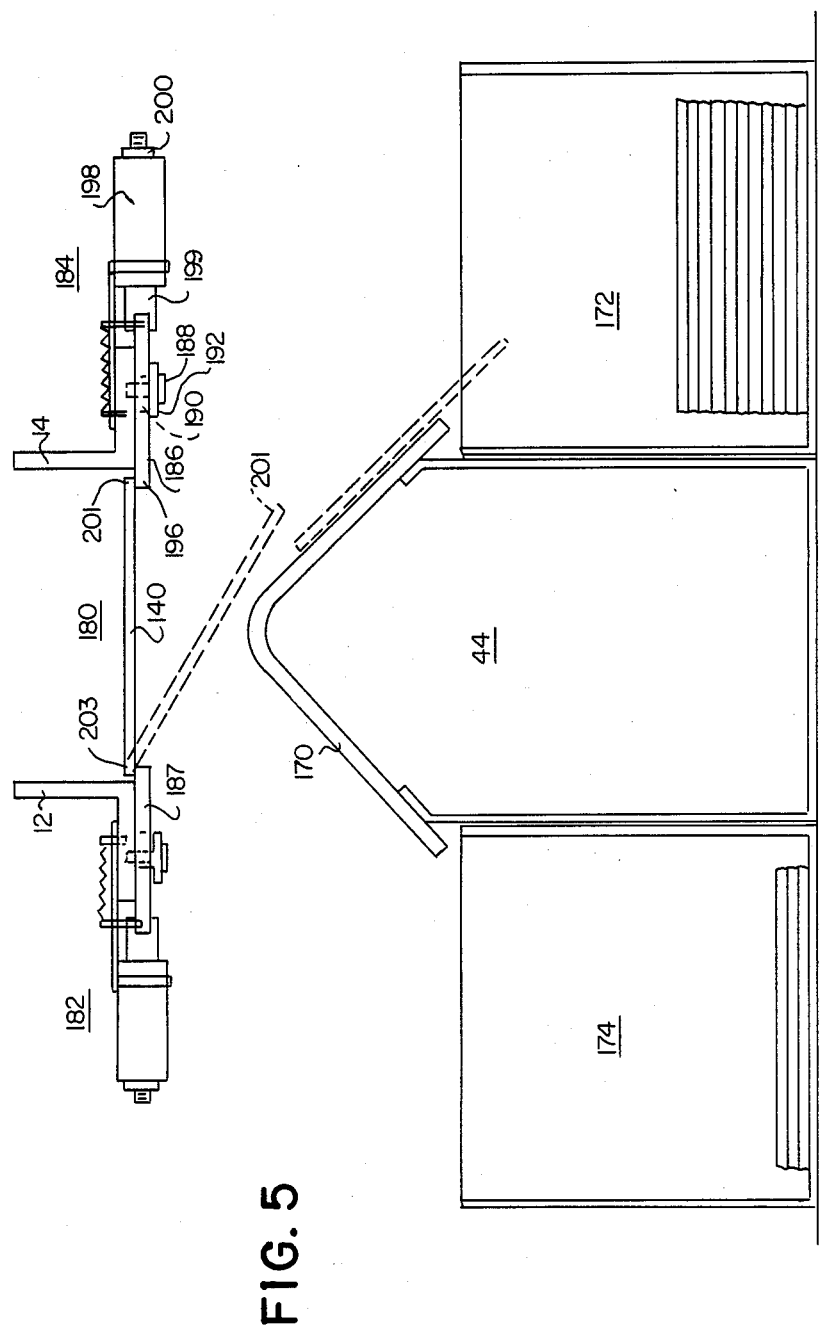
FIG. 5 is an end elevational view of the sorter mechanism of the present invention.

FIG. 5. depicts an end elevational view of the sorter mechanism 44 of the instant invention. To sort the processed disk, an inverted "V" shaped tent-like structure 170 is disposed beneath the disk 140. The sorter tent 170 has rectangular planar sides which meet in an apex. On one side of the tent 170 is an accept bin 172 and on the other side is a reject bin 174. The sorter 44 includes tow identical selecting mechanisms 182 and 184, one of which will be described, it being understood that the other operates in identical fashion. Selection mechanism 184 has a sorter plate 186 which is slideably engaged beneath channel 14. To achieve the slideable engagement, a two slotted holes 190 (one of which is seen in FIG. 5.) are formed through plate 186. A shoulder screw 188 penetrates through the slotted hole 190 and is threadably engaged in channel 14. A nylon washer 192 is used to aid the slideable engagement. In its home position an inward edge 196 of sorter plate 186 protrudes into the disk space 180 between channel members 12 and 14. The inner end 196 of plate 186 serves as the disk support rail for disks passing through the sorter mechanism from the hopper to the disk drive. A solenoid 198 is fixedly engaged to channel 14 and the plunger 199 is joined to the outer end of the sorter plate 186. It is therefore to be understood that the actuation of solenoid 198 will cause plunger 199 to move sorter plate 186 rightwardly in FIG. 5, such that the end 196 of plate 186 will be drawn out of its protruding home position beneath disk 140. An adjustment nut 200 on solenoid 198 serves to adjust the depth of protruding of end 196 beneath disk 140. Thus, upon movement of plate end 196 from its supporting position beneath disk 140, it is to be understood that end 201 of disk 140 will commence to fall by the action of gravity, whereas end 203 will remain supported. Thus, end 201 will become the leading falling edge of disk 140, whereby upon contact with the sorter tent 170, the disk 140 will fall into the accept bin 172. It is likewise to be understood that the operation of select mechanism 182 will cause the leftward motion of sorter plate 187 and the dropping of disk edge 203, whereby edge 203 would become a leading falling edge of a disk which would strike sorter tent 170 and fall into reject bin 174.

As depicted in FIG. 6, a stack of disks, labeled A, B, C, D, is seen loaded into the hopper. The carriage mechanism 24 and the kicker plate 62 are in their home position. The pressure plate solenoid is not activated, whereby the spring 108 is applying a downward force upon the pressure plate 98 and its rubber pad 100 such that the disks B, C, D, E, etc. are held in a clamped position between the rubber pads 100 and 58.

Figure 7:
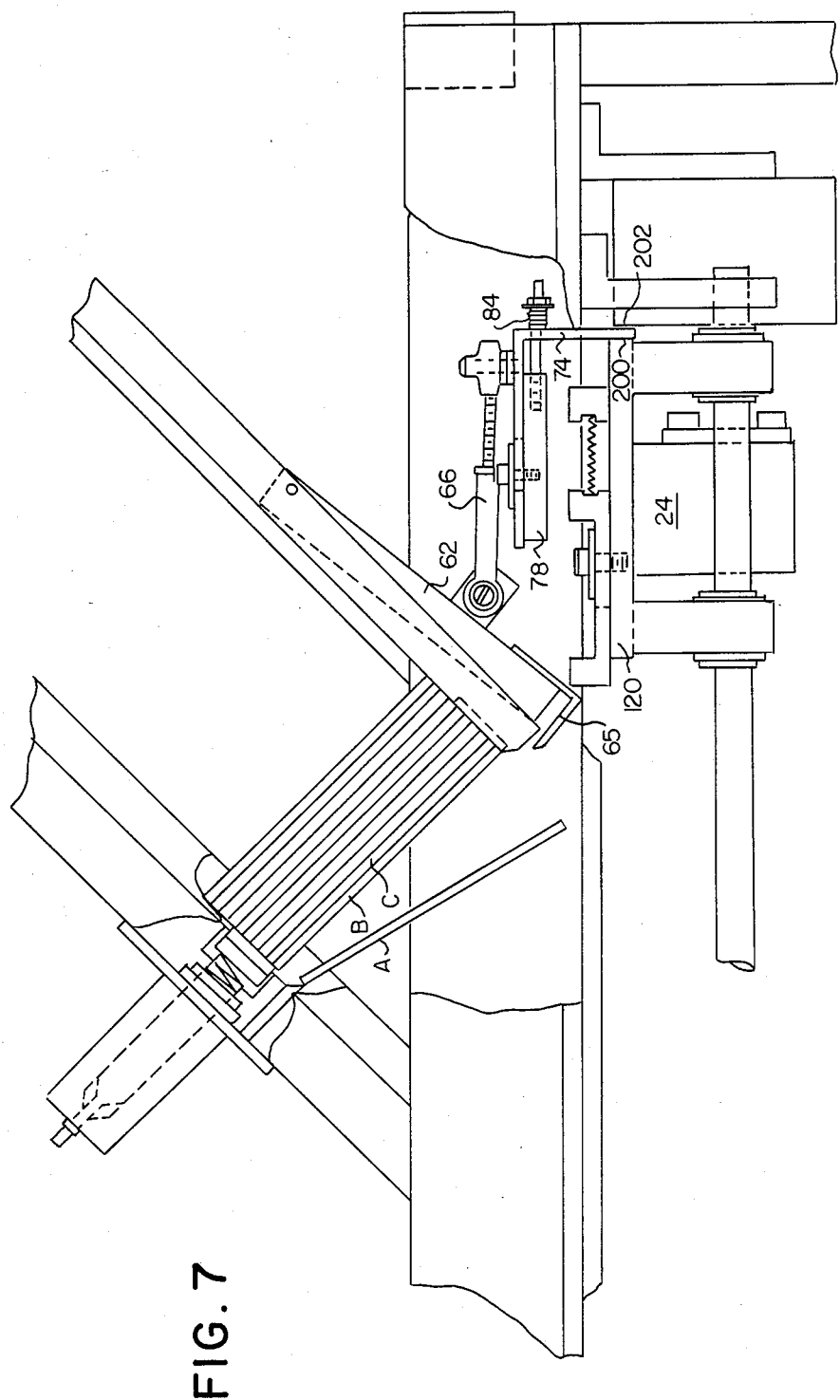
FIG. 7 is a side elevational view of the hopper mechanism of the present invention during another stage of hopper activation.
Figure 8:
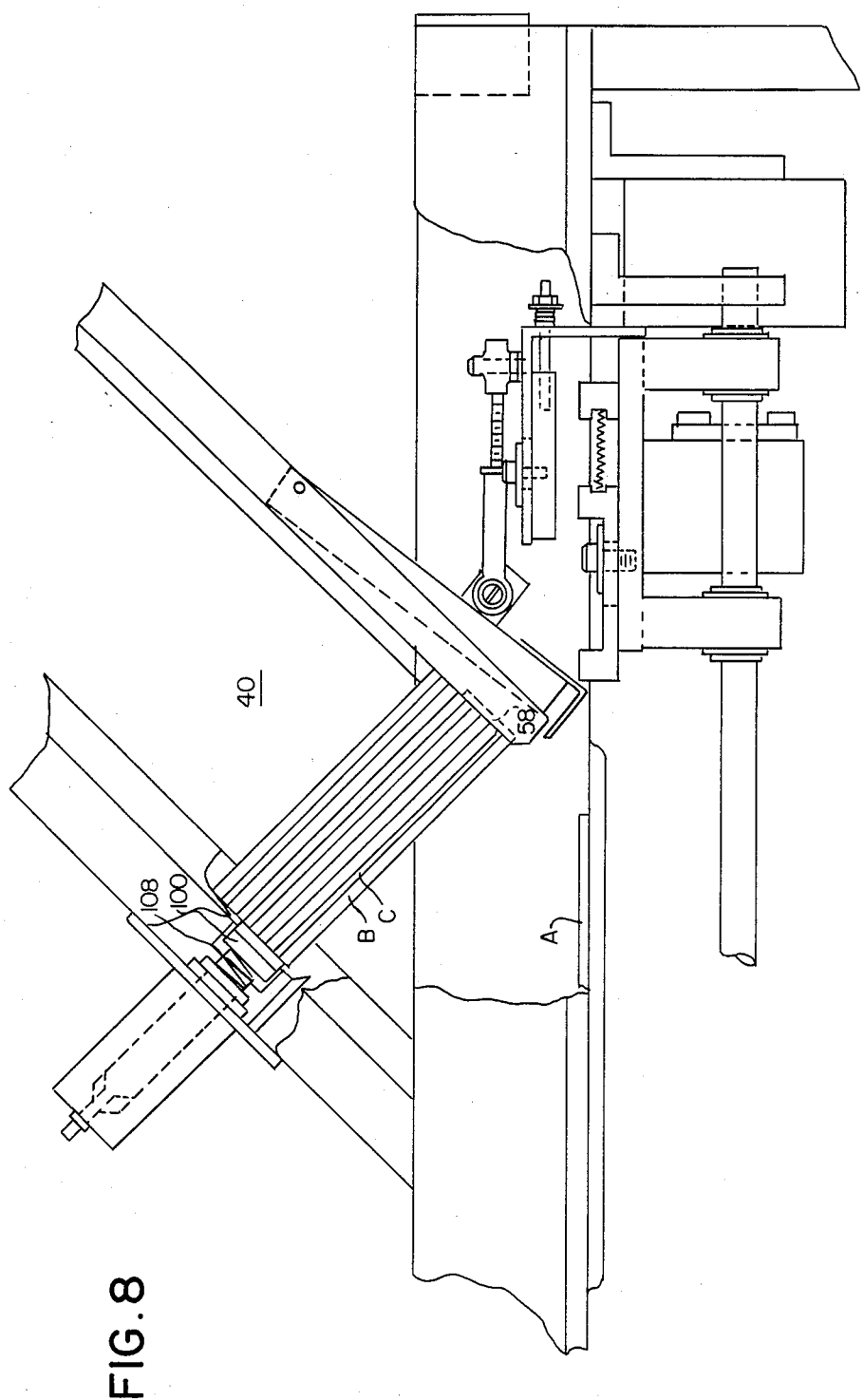
FIG. 8 is a side elevational view of the hopper mechanism of the present invention during a further stage of hopper activation.

As depicted in FIG. 7 on a first rotation of the lead screw 34, the carriage 24 is moved backwards, whereby the rearward portion 200 of the platform 120 makes contact with and pushes against the lower portion 202 of the kicker plate actuator 74. The actuator return spring 84 is compressed by the rearward movement of the actuator 74 upon platform 78. The rearward movement of the actuator 74 causes the kicker plate 62 to be pulled downward by connecting rod 66. The downward movement of the kicker plate 62 causes the lower stop 65 to be removed from its position in front of the disk stack. Disk A, which was not held between the rubber pads 58 and 100 becomes unsupported at its lower end and start to fall, which in turn, causes disk A to clear the upper disk stop 96 and ultimately fall onto the disk support rail 13, as depicted in FIG. 8. The chamfered edges 60 and 112 aid in the proper falling motion of disk A.

FIG. 8 depicts the orientation of the device after disk A has fallen onto the disk support rail 13. It is to be noted that the remaining disks B, C, etc., do not move downwardly in the hopper 40 at this time due to the pressure on the disks from the rubber pads 58 and 100. In that pad 58 is static the holding pressure is created by pad 100 which is urged downwardly by spring 108.

Figure 9:
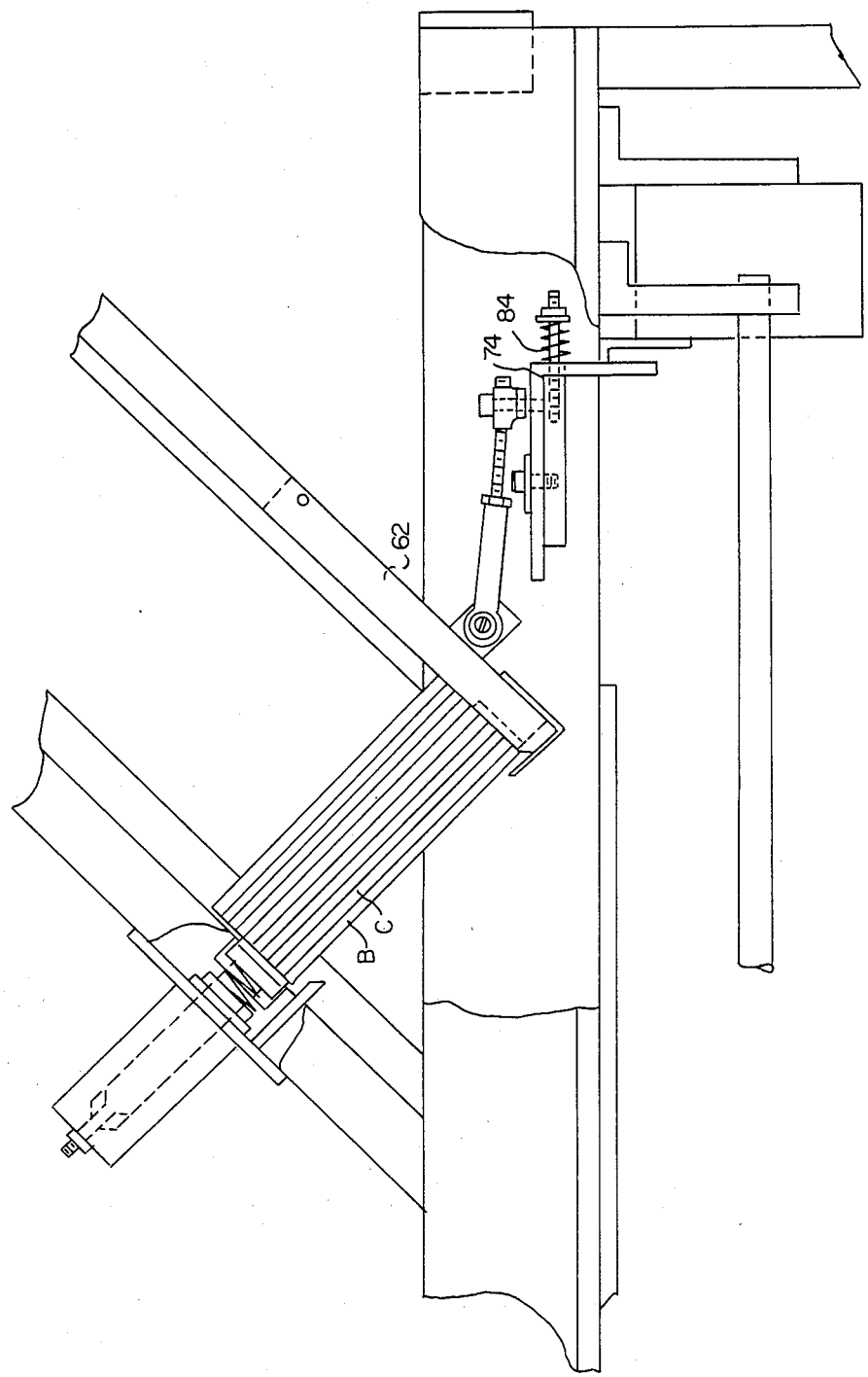
FIG. 9 is a side elevational view of the hopper mechanism of the present invention during yet another stage of hopper activation.

In FIG. 9, the lead screw has been rotated to cause carriage 24 to push disk A in to the disk drive; thus both the carriage and disk A are not located in the hopper area and are not shown in FIG. 9. The movement of the carriage 24 has permitted the actuator spring 84 to urge the actuator plate 74 back to its home position. Thus, kicker plate 62 has been pushed upwardly against the lower edges of disks B, C, D, etc. in the hopper.

In order to reduce cycling time of the device, the loading of disks B is accomplished while disk A is being processed within the disk drive. To permit the disks in the hopper to move downwardly, such that disk B will be in position for loading, it is necessary to release the pressure that holds the disks in place. To release the pressure, the pressure plate solenoid 106 is activated. As depicted in FIG. 10, upon activation of solenoid 106 the pressure plate 98 and its attached rubber pad 100 are drawn into the slots 102, whereby the pad 100 no longer makes contact with the top edge of the disks. Upon release of the pressure the weight of the disks causes the stack to move downwardly, whereby disk B falls into the loading position previously occupied by disk A, as depicted in FIG. 6. In order to further aid the disks in the downward motion, spring 84 is strong enough such that when the solenoid 106 takes the pressure off the disks, the kicker plate moves slightly upward, pushing the lower edges of the the lowermost disks off of the rubber pad 58 and permitting a smoother downward movement of the stack of disks. As is also depicted in FIG. 10, the carriage 24 has been returned to its home position by rotation of the lead screw. Upon release of the solenoid 106, the spring 108 will again urge the rubber pad 100 into pressurized contact with the tops of the disks, except disk B. Following the return of rubber pad 100 to pressurized contact, the hopper and carriage mechanism of FIG. 10 is returned to its initial configuration depicted in FIG. 6, and the device is now ready for a second cycle wherein disk B will be dropped into disk drive loading position upon support rail 13.

It is to be understood that while disk B can now be dropped onto rail 13, by the steps depicted in FIGS. 6, 7 and 8, this process has occured while disk A is being processed by the disk drive and it is not possible to load disk B into the disk drive 42 until disk A's processing is completed and it has been ejected from the disk drive and sorted into an accept or reject bin by the sorter mechanism previously described. Thus, after disk A has been sorted, and the sorter plates 186 or 187 have returned to their home position it is then possible to rotate the lead screw to activate the carriage 24 to push disk B into the disk drive 42.

Although the present invention has been described herein in terms of the inventor's preferred embodiments, it will be appreciated by those skilled in the art that alterations and modifications thereof will be readily made to suit particular needs and applications. It is therefore intended that the following claims be interpreted as covering all such alterations and modifications as fall within the true spirit and scope of the invention.

What is claimed is:

1. In an automatic loading and sorting device for automatically placing computer disks into a disk drive and thereafter sorting said disks into accept or reject groups, including a frame supporting a horizontal track having two side rails which support opposing parallel edges of said disk in a flat, horizontal orientation, a hopper mechanism located at a first end of said track for holding a plurality of disks and selectively removing one said disk at a time for processing within said disk drive, a disk drive located at a second end of said track for processing said disks, a carriage mechanism moveably attached to said frame for moving said disks from said hopper into said disk drive, a sorting mechanism for selectively placing said disks into said groups, said sorting mechanism being attached to said frame and being generally located between said hopper mechanism and said disk drive, and a disk ejection mechanism for placing disks ejected from said disk drive into proper orientation relative to said sorting mechanism, the improvement therein comprising:

said hopper mechanism being formed with a disk removal means for removing a first lowermost disk from a stack of disks loaded within said hopper, said stack of disks being held in said hopper at an angle which differs substantially from the vertical;

said disk removal means including upper and lower stops being disposed to restrain said disks within said hopper and to removably support said lowermost disk, said lower stop being actuatable to be moved from its stopping position at a lower edge of said lowermost disk;

said disk removal means also including a selection means being provided to allow only one disk to be removed from said hopper upon actuation of said lower stop, said selection means including a pressure means selectively actuatable to apply pressure to a plurality of disks immediately above said lowermost disk within said stack; said pressure means including a solenoid means disposed to make pressurized contact with said disks, said solenoid means having a resilient member engaged therewith and disposed to make resilient contact with a first edge of said disks;

said hopper having a second resilient means engaged therewith and disposed to make resilient contact with a second edge of said disks; and said selection means also including a kicker means actuatable upon the removal of pressure upon said stack of disks by said pressure means to urge said stack of disks to fall downwardly within said hopper following the removal of said lowermost disk, such that a second disk immediately above said removed lowermost disk will be positioned against said upper and lower stops, whereby said second disk will then be the lowermost disk in said stack and will be in position for subsequent removal; said kicker means being actuable to engage said second edge of said disks to urge said second edge out of contact with said second resilient means.

2. An automatic loading device as recited in claim 1 wherein said lower stop is engaged to said kicker means.

3. In an automatic loading hopper for computer disks having a hopper area for holding a stack of disks for individual selection and placement upon a processing frame, the improvement therein comprising:

means to remove a first lowermost disk from the stack, said stack of disks being held in said hopper at an angle which differs substantially from the vertical;

said disk removal means including upper and lower stops being disposed to restrain said disks within said hopper and to removably support said lowermost disk, said lower stop being actuatable to be moved from its stopping position at a lower edge of said lowermost disk;

said disk removal means also including a selection means being provided to allow only one disk to be removed from said hopper upon actuation of said lower stop, said selection means including a pressure means selectively actuatable to apply pressure to a plurality of disks immediately above said lowermost disk within said stack; said pressure means including a solenoid means disposed to make pressurized contact with said disks, said solenoid means having a resilient member engaged therewith and disposed to make resilient contact with a first edge of said disks;

said hopper having a second resilient means engaged therewith and disposed to make resilient contact with a second edge of said disks; and said selection means also including a kicker means actuatable upon the removal of pressure upon said stack of disks by said pressure means to urge said stack of disks to fall downwardly within said hopper following the removal of said lowermost disk, such that a second disk immediately above said removed lowermost disk will be positioned against said upper and lower stops, whereby said second disk will then be the lowermost disk in said stack and will be in position for subsequent removal; said kicker means being actuable to engage said second edge of said disks to urge said second edge out of contact with said second resilient means.

4. An automatic loading device as recited in claim 3 wherein said lower stop is engaged to said kicker means.

* * * * *